No. 644,824. Patented Mar. 6, 1900.
A. HEUSCH.
KNOTTER FOR HARVESTERS.
(Application filed Feb. 4, 1898.)
(No Model.) 9 Sheets—Sheet 2.

Witnesses:
Inventor
Anton Heusch
By Wm Zimmerman
Atty

No. 644,824. Patented Mar. 6, 1900.
A. HEUSCH.
KNOTTER FOR HARVESTERS.
(Application filed Feb. 4, 1898.)
(No Model.)
9 Sheets—Sheet 4.

Witnesses;
Edw. Stotz
C. b. Clark

Inventor
Anton Heusch.
By Wm Zimmerman
Atty.

No. 644,824. Patented Mar. 6, 1900.
A. HEUSCH.
KNOTTER FOR HARVESTERS.
(Application filed Feb. 4, 1898.)
(No Model.) 9 Sheets—Sheet 5.

Witnesses:
Edw. O. Stoll
C. C. Clark

Inventor
Anton Heusch.
By Wm. Zimmerman.
Atty.

No. 644,824. Patented Mar. 6, 1900.
A. HEUSCH.
KNOTTER FOR HARVESTERS.
(Application filed Feb. 4, 1898.)

(No Model.) 9 Sheets—Sheet 6.

Witnesses:
Maurice C. Lange.
Jacob T. Wainwright.

Inventor
Anton Heusch.
By Wm. Zimmerman.
Atty.

No. 644,824. Patented Mar. 6, 1900.
A. HEUSCH.
KNOTTER FOR HARVESTERS.
(Application filed Feb. 4, 1898.)
(No Model.) 9 Sheets—Sheet 7.

Witnesses:
Edw. Slotts
C. C. Clark

Inventor
Anton Heusch.
By Wm. Zimmerman,
Atty.

No. 644,824. Patented Mar. 6, 1900.
A. HEUSCH.
KNOTTER FOR HARVESTERS.
(Application filed Feb. 4, 1898.)
(No Model.) 9 Sheets—Sheet 8.

Witnesses:
Edw. Stotts
C. C. Clark

Inventor
Anton Heusch.
By Wm. Zimmerman,
Atty.

THE NORRIS PETERS CO., PHOTO-LITHO., WASHINGTON, D. C.

No. 644,824. Patented Mar. 6, 1900.
A. HEUSCH.
KNOTTER FOR HARVESTERS.
(Application filed Feb. 4, 1898.)

(No Model.) 9 Sheets—Sheet 9.

Witnesses:
Inventor:
Anton Heusch.
By Wm Zimmerman
Atty.

UNITED STATES PATENT OFFICE.

ANTON HEUSCH, OF CHICAGO, ILLINOIS, ASSIGNOR OF ONE-HALF TO WILLIAM ZIMMERMAN, OF SAME PLACE.

KNOTTER FOR HARVESTERS.

SPECIFICATION forming part of Letters Patent No. 644,824, dated March 6, 1900.

Application filed February 4, 1898. Serial No. 669,110. (No model.)

*To all whom it may concern:*

Be it known that I, ANTON HEUSCH, a citizen of the United States, residing at Chicago, in the county of Cook and State of Illinois, have invented certain new and useful Improvements in Knotters for Harvesters, which are fully set forth in the following specification, reference being had to the accompanying drawings, forming a part hereof, and in which—

Fig. 2 shows the plan view of Fig. 1. Fig. 10ª shows a shaft of the twine-holding mechanism, which is also one foot of the knotter-frame, in side elevation with a small fragment of the knotter-frame. Fig. 11 shows the several parts of the twine-holder connected and in plan view. Fig. 12 shows the toothed twine-holding disk, its pinion, and sleeve connecting said parts in side elevation. Fig. 13 shows the finger edge of the base-plate of the knotter and its finger without the parts shown in Fig. 12. Fig. 14 shows the base-plate of the twine-holder in plan view. Fig. 23 shows a cam-arm in side elevation with part of its bolt-chamber broken away. Fig. 23ª shows Fig. 23 reversed end for end. Fig. 37 shows a staple $u$, cast integral with an arm of the knotter-frame. Fig. 38 shows a fragment of the knotter-frame. As here shown the cam $h^8$ forms the edge between the opposite face of the frame and the cam $h$, which is underneath. In other words, said cams $h$ and $h^8$ coincide at their starting-points.

Likes letters and figures of reference denote like parts of the drawings.

Figure 1:
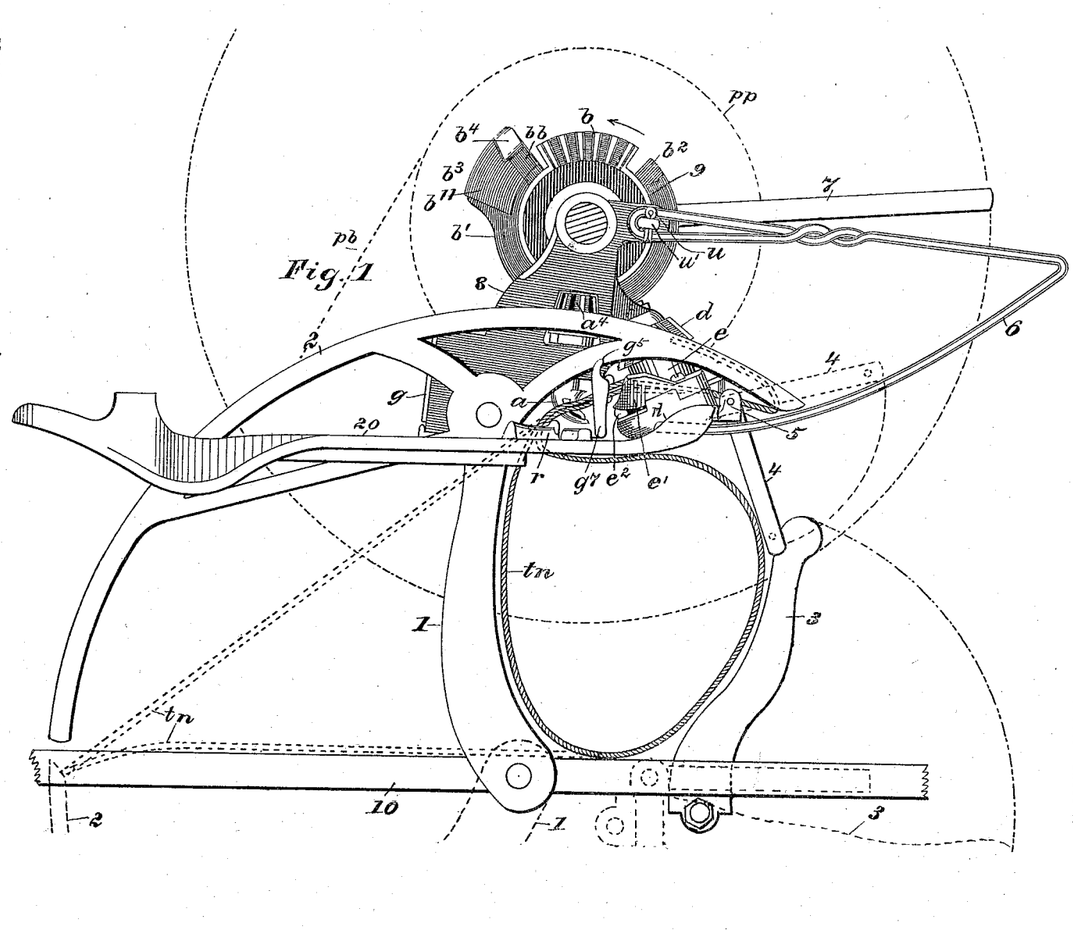
Figure 1 shows my new knotter in longitudinal side elevation with the twined needle in front thereof and at the end of its upstroke, the twine shown as surrounding the bundle-space in full lines and its two other portions in broken lines, together with some of the parts necessary to form and hold the bundle.
Figures 2, 10A, 11, 12, 13, 14:
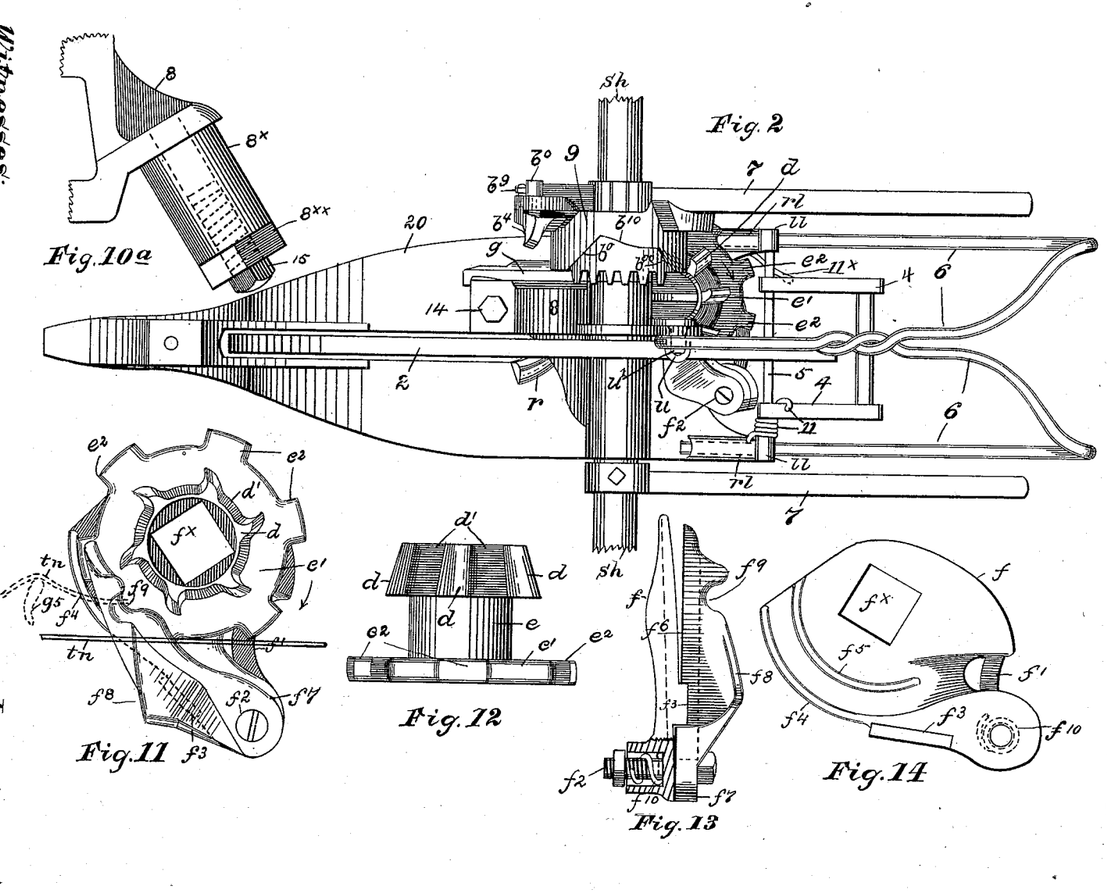
Figures 3, 6, 7, 8, 9, 10:
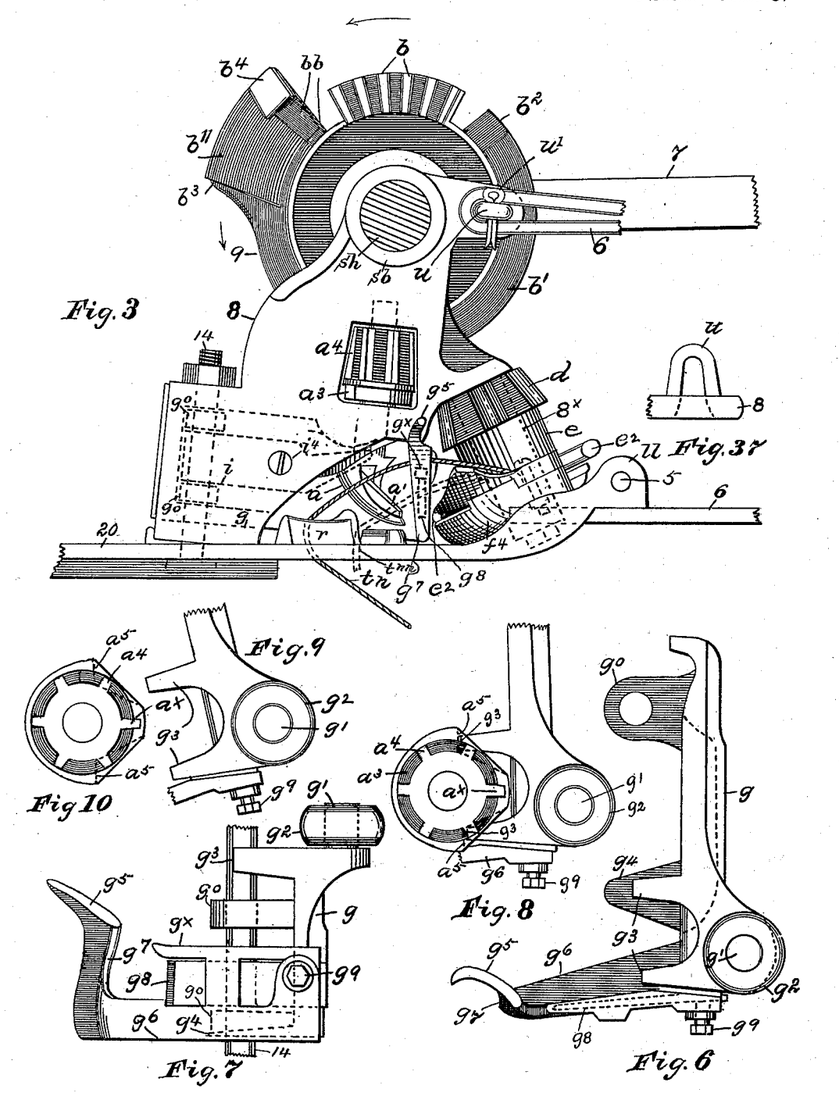
Fig. 3 shows the same view of the knotter-frame as is seen in Fig. 1, on an enlarged scale, with a fragment of the breastplate and the needle and parts below the breastplate omitted.
Fig. 6 shows the latch $g$ in plan view.
Fig. 7 shows in end view a transverse arm attached to the free end of the latch.
Fig. 8 shows the outer end of the latch and knotter-head pinion in locked position.
Fig. 9 shows the outer end of the latch in unlocked position.
Fig. 10 shows the knotter-head pinion with the part Fig. 9 near it, said two parts being placed as seen in their unlocked position.
Figure 4:
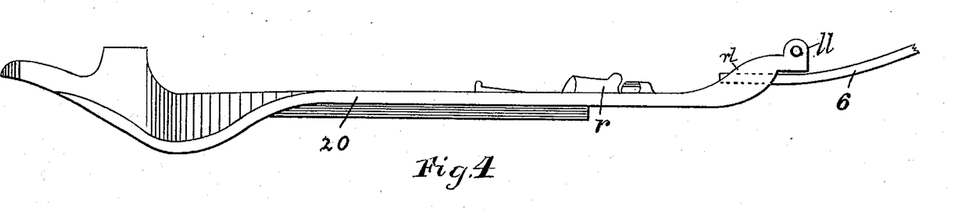
Fig. 4 shows a breastplate in longitudinal side elevation with a fragment of the bundle-guard.
Figure 5:
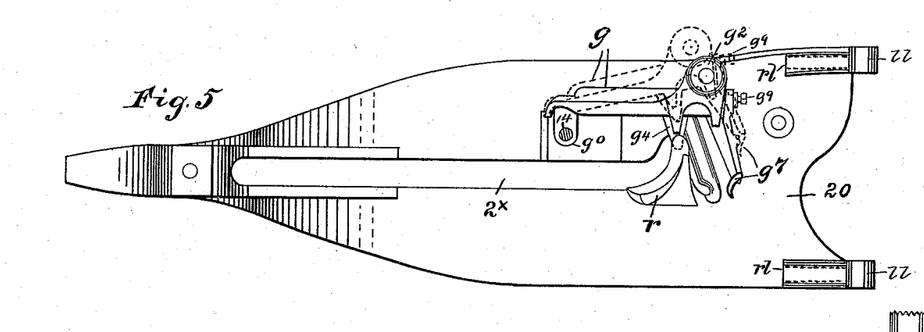
Fig. 5 shows Fig. 4 in plan view and with the latch $g$ in both of its extreme positions and the bundle-guard ends omitted.
Figure 15:
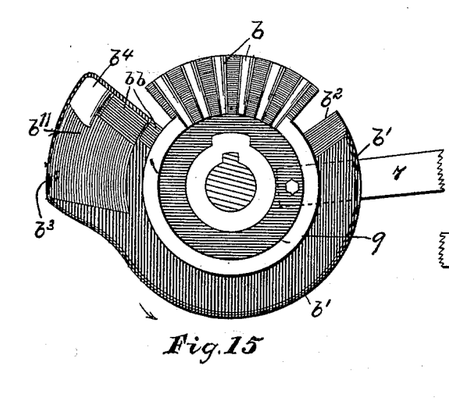
Fig. 15 shows the tier-wheel on the face side of the flange and gear-rack.
Figure 16:
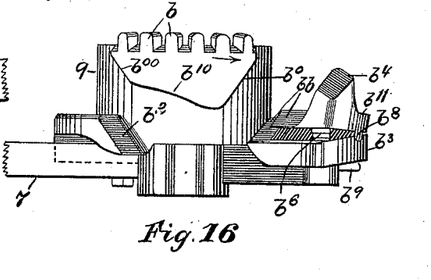
Fig. 16 shows the tier-wheel in elevation or Fig. 15 revolved a half-revolution in the plane of the paper and a quarter-revolution from the plane of the paper on a transverse axis from right to left and vertical to the plane of the paper.
Figure 17:
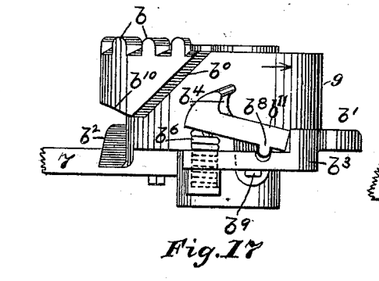
Fig. 17 shows Fig. 16 turned a quarter-revolution to the left.
Figure 18:
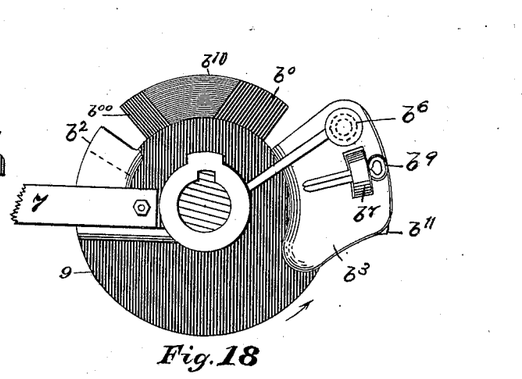
Fig. 18 shows Fig. 15 revolved a half-revolution on an axis in the plane of the paper parallel with its border-lines.
Figure 19:
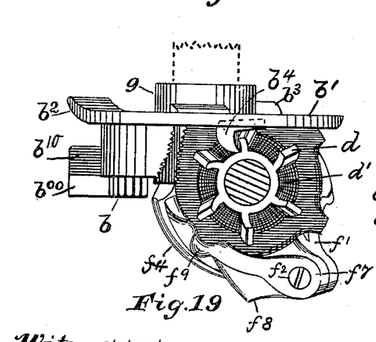
Fig. 19 shows a tier-wheel and twine-holder in plan view with the larger part of the tier-wheel broken away, showing the twine-holder and its pinion under it and the engagement of the spur with the twine-holder pinion.
Figure 20:
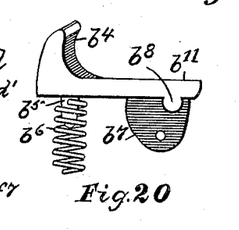
Fig. 20 shows in side elevation the hinge-plate, its spur, spring, and hinge.
Figure 21:
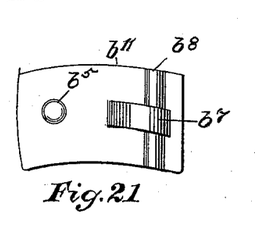
Fig. 21 shows Fig. 20 on its under side.
Figure 22:
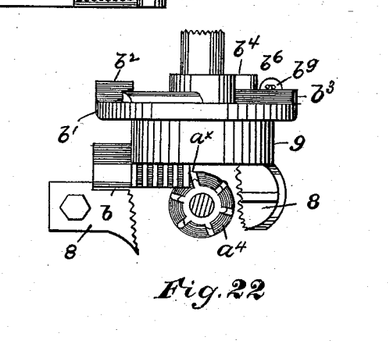
Fig. 22 shows a fragment of the knotter-frame in plan view to expose the knotter-head pinion and the tier-wheel rack-gear engaging said pinion with its first tooth.
Figures 23, 23A:
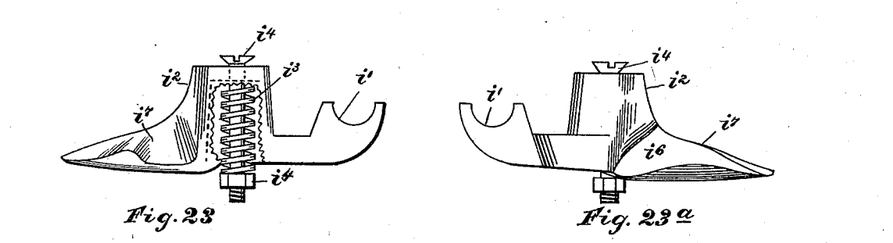
Figure 24:
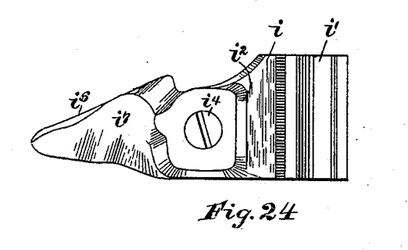
Fig. 24 shows the cam-arm shown in Fig. 23 on its inner side.
Figure 25:
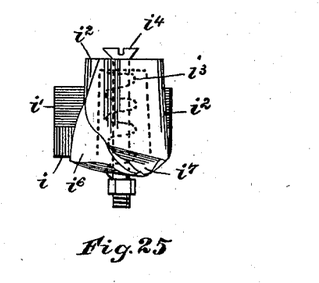
Fig. 25 shows Fig. 23 from its point end.
Figure 26:
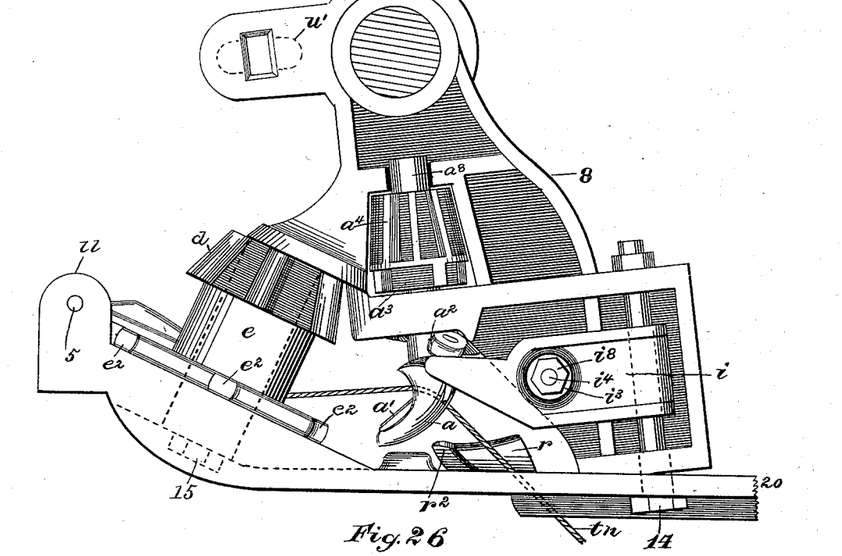
Fig. 26 shows the knotter-frame on its rear or ribbed side with the twine-holder and cam-arm, the latch being removed and the bill of the knotter-head in its first position or starting-point.
Figure 27:
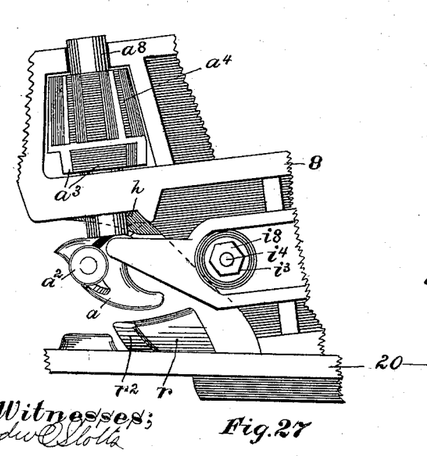
Fig. 27 shows a fragment of the knotter-frame with the bill of the knotter-head advanced about one-quarter of a revolution on a fragment of the knotter-frame.
Figure 28:
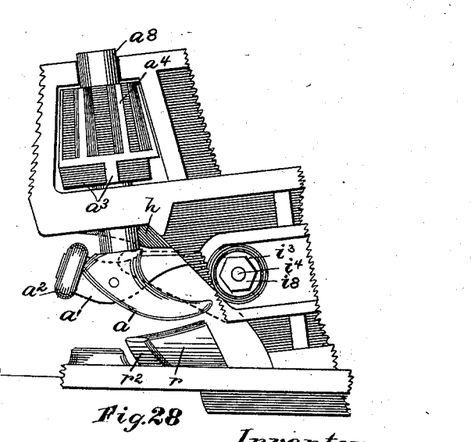
Fig. 28 shows a fragment of the knotter-frame with the knotter-head bill advanced to about a half of a revolution.
Figure 29:
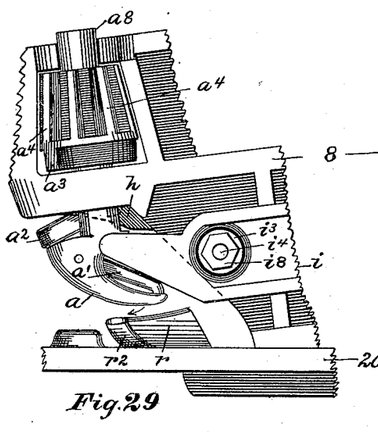
Fig. 29 shows a fragment of the knotter-frame with the bill of the knotter-head advanced about three-quarters of a revolution.
Figure 30:
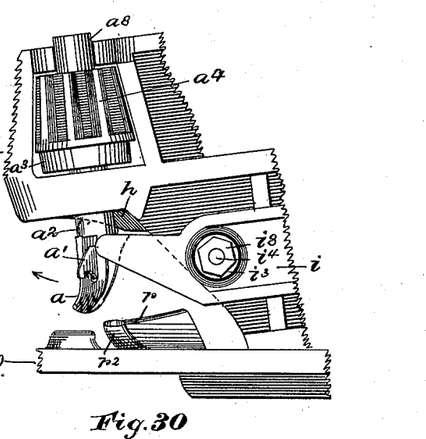
Fig. 30 shows a fragment of the knotter-frame with the bill of the knotter-head advanced into the last quarter of its revolution and open to receive the two twine ends, already in part wound on the bill, to tie the knot.
Figure 31:
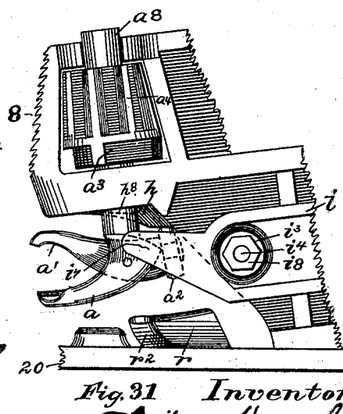
Fig. 31 shows the bill advanced to the point where the cam of the cam-arm $i$ closes the bill.
Figure 32:
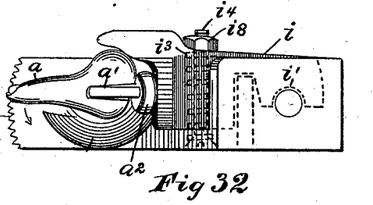
Fig. 32 shows the knotter-head with the bill in the position shown in Fig. 31 as seen from the under side, with cam-arm and a part of the knotter-frame.
Figure 33:
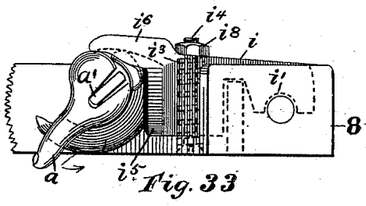
Fig. 33 shows the knotter-head with the bill in the position shown in Fig. 26 as seen on the under side, with cam-arm and part of the knotter-frame.
Figures 34, 35, 36:
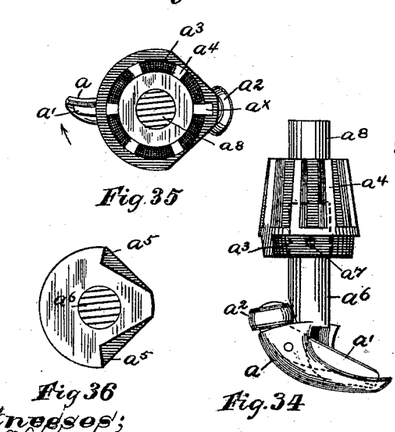
Fig. 34 shows the knotter-head and the socketed pinion (indicated in broken outlines) and the knotter-head shaft and its pin-key.
Fig. 35 shows the knotter-head pinion as seen from the top, with its high spur and its position relative to the bill.
Fig. 36 shows the cam $a^3$, forming a part of the pinion $a^4$, as seen on its under side, and its shaft in section.
Figure 38:
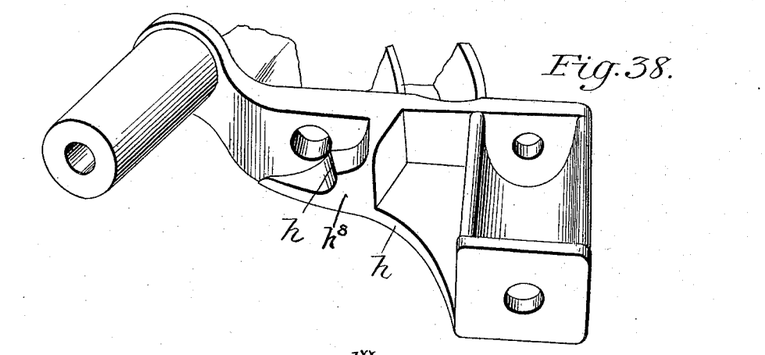
Figure 39:
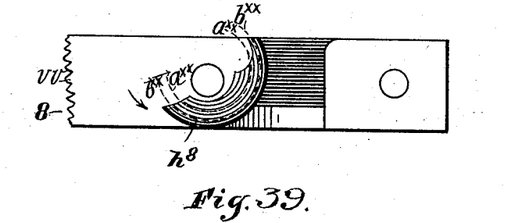
Fig. 39 shows an under view of a part of the frame 8 without the knotter-bill.
Figure 40:
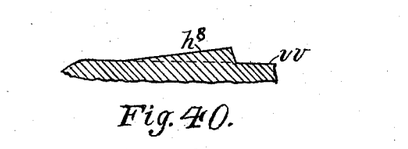
Fig. 40 shows a sectional profile of the cam $h^8$ on the cylindrical surface indicated by the line $a^{xx}$ on Fig. 40.
Figure 41:
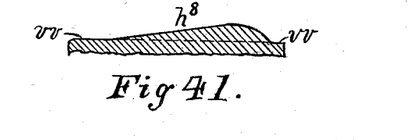
Fig. 41 indicates a sectional profile on the cylindrical surface indicated by the broken line $b^{xx}$ of Fig. 39.

The objects of my invention are to simplify and improve the construction and operation of the mechanism which ties the cord-knot which binds the grain-bundle on the harvesting-machine. To attain said desirable ends, I construct my said improved device in substantially the following manner, namely:

On the breastplate 20 is secured the knotter-frame 8, which consists of a single piece of casting in the form of a flat plate, as shown in Figs. 1 and 3, whereof the opposite side is provided with suitable ribs and projections, to which the several working parts are attached, as shown in Fig. 26 and in part in Figs. 27, 28, 29, 30, and 31. Said frame stands upon two supports, one of which is held to the breastplate by a long bolt 14, which passes through two of said ribs of the frame-plate and also forms the pintle or hinge support upon which the hinged cam-arm $i$ and the latch $g$ turn, and the other of said supports, also cast integral with the frame, is held to the breastplate by a short bolt 15, axially coincident with said support, which at the same time is the fixed shaft $8^x$, upon which rotates the rotatable part of the twine-holder. (Shown in Fig. 12.) It is, however, preferred to cast said fixed shaft with an axial opening through its entire length and to hold it with a bolt like 14. In Fig. 10$^a$ the lower part is shown with rectangular sides $8^{xx}$ to hold a non-rotatable part of the twine-holder. Such a non-rotatable member is seen in Fig. 14, the hole $f^x$ fitting on the part $8^{xx}$ of the stud $8^x$, and another is seen in Fig. 11, where the twine-holding members are together; but the stud $8^x$ is removed and the hole $f^x$ shown in plan view. Between said supports there is an arch-like open space wherein about centrally operates the well-known knot-tying mechanism whereof the knot-tying device, with its shaft, somewhat resembles an inverted head and neck of a bird. For convenience of description, therefore, the part $a'$ will be called the "mandible" and the part $a$ the "maxilla," and the two together will be called the "knotter-head" or "knotter." The mandible works within the maxilla on a pivot, which together form the knotter-head, which is provided on its rear end with a cam-roller $a^2$ and turns on a pinioned shaft $a^6$ of the usual construction; but the cams which actuate said mandible and the pinion on said shaft and the parts on or working with said parts have new forms and functions. The pinion-shaft $a^6$ enters the cam $a^3$ and lower part of the pinion $a^4$ through a socket, said cam and pinion being formed as an integral part fitting closely and are fastened by a pin $a^7$. The pinion $a^4$ plays in an opening in the plate of the frame 8, there being a transverse rib above and below it, the upper one having an open-notch bearing to receive the gudgeon $a^8$, said gudgeon being cast integral with the pinion $a^4$, and the shaft $a^6$ is passed through a hole bored through the rib below the pinion, which forms the bearing for the lower end of its shaft. The frame and the pinion and its shaft are thus easily fitted together and to place, where they are permanently secured by a pin $a^7$, as shown, and by this construction the said several parts may be made as small as possible to attain the requisite speed and still be of sufficient strength. If said shaft passed through said pinion, the latter would have to be enlarged to get sufficient strength, the shaft $a^6$ being already reduced to its smallest possible diameter. The pinion-cam has two diametrically-opposed shoulders $a^5$ so set on the shaft relative to the point of the bill as to stand in a certain desired direction (indicated in Figs. 8, 10, 26, and 35) when all of the connected working parts thereto are set to begin work. When in said condition, the spurs $g^3$, forming a part of the latch $g$, are at the limit of their inward motion and at rest and firmly held by the tier-wheel 9, fixed to the shaft $sh$. Said tier-wheel has a flange $b'$, which comprises approximately five-sixths of a complete circle, and in the gap thus formed is a cam, having the cam-faces $b^{00}$ $b^{10}$ $b^0$ and at the other end or edge of the wheel the radial gear-teeth $b$. The rear end of the flange is thickened and beveled outward to form the inclined face $b^2$, and the other end thereof is formed into a broadened and notched part $b^3$, with a slot to receive the lug $b^7$, held on its under side with a key-pin $b^9$, said lug being a part of a hinged plate $b^{11}$, lying in the recessed part $b^3$. On the under side of said plate is a half-round transverse rib $b^8$, for which there is a corresponding but shallower groove in the face of the part $b^3$ to receive it and to thus form a hinge on which the plate $b^{11}$ may have sufficient play at its free end to operate sufficiently and whereon, at its outer corner, are a tooth $b^4$ over a spur $b^5$, which enters a pocket in the plate $b^8$, and a coiled spring $b^6$, which it holds and which said spring raises from said flange. Between said spur $b^4$ and the wheel the hook-plate and flange are both beveled in the outward direction, like the face $b^2$, so as to form when lying together the continuous face $b\ b$, between which and the face $b^0$ there is a space to freely pass the roller $g^2$, there being a like space between the faces $b^{00}$ and $b^2$, the concave cam-face $b^{10}$ guarding said roller and its attached parts from too-early and too-far-inward motion, but going in far enough on the point of the cam $a^5$ to prevent its further rotation, the twine drawing the roller $g^2$ onto the cam-face $b^{10}$. The latch $g$ is hinged by two lugs $g^0$ on the bolt and has at its free end a transverse arm $g^6$, which carries at its outer end a vertical arm $g^7$, on the top of which is an arm $g^5$, of which its upper face is inclined at an angle of about forty-five degrees toward the latch $g$, and on the arm $g^6$ is a knife-holding frame, wherein the edge $g^8$ stops against a small shoulder (here shown to be in the arm $g^6$) to form a stop for the knife, which is here the lower end of the knife-edge itself which strikes said stop. Thereby the cutting edge will always be in the same line, irrespective of the amount that may be ground away, and becomes a self-adjustment that is practically perfect. There is a knife-holding frame on the upper edge of the arm $g^6$, on the top of which is a bar or guard $g^\times$, which extends beyond the knife-edge, so as to leave a narrowed pass from below said guard in front of the knife-edge and the rear edge of the arm $g^7$. Said guard receives the twine on it as it is laid to the twine-holder, and the arm $g^7$ draws the twine back and bends it out of the right line when the latch makes its rearward stroke, as is shown in Fig. 11, where the twine as laid by the needle is shown in full lines, and its position and form when drawn back by the arm $g^7$ is shown by the broken line $t\ n$.

Between the latch-lugs $g^0$ is held the hinge end of the cam-arm $i$, of which the mandible-actuating cams form an integral part. At said end there is a half-round joint $i'$, which lies on the bolt $i^4$ and is held thereon between the latch-lugs $g^0$ and the front of the latch, which is suitably recessed to receive and allow the proper play for said cam-arm, as indicated by the broken line in Fig. 6. Said arm is held in its proper place by means of a coiled spring $i^3$ on a bolt $i^4$, which is in a chambered boss $i^2$, which abuts against the inner side of the plate of the frame 8, through which the bolt $i^4$ is passed and on which its head turns freely. Said bolt has a screw-driver head, but its action cannot be changed by the screw-driver only, as its threaded nut $i^8$ turns freely to prevent change of adjustment in that way—something for the manufacturer rather than the user of the machine.

At the top and front of the frame-arch and near the knotter-head shaft begins an inclined cam $h$, as shown in Figs. 3, 26, 27, 28, 29, 30, 31, 32, and 33, which inclines downward and backward from the face of the frame at a suitable angle to receive and depress the front end of the mandible and to then pass it to the reciprocable cams $i^5\ i^6$ of the cam-arm $i$, held close to the cam $h$ during the time the mandible is passing from the cam $h$ to the cams $i^5\ i^6$. When the mandible-point leaves the cam $i^6$, the mandible-roller $a^2$ is at the foot of the cam $h^8$, which is on a shorter radius than the cams $h\ i^5\ i^6$, and said cam imparts a contrary motion to the point of the mandible, and thereby reopens the bill to get the twine into it in the latter part of the revolution of the knotter-head, and when the roller $a^2$ passes upon the cam-face $i^7$ the mandible closes upon the two twine ends, following which the loop slips from the knotter-head over the bill with its inclosed ends of the twine, and thereby completes the knot. The knot now falls upon that part of the breastplate which contains the narrow transverse end of the slot $2^\times$, one side of said knot falling on the spur $r$, while the other side is held by the breastplate, along which it is drawn by the force of the bundle-ejector arms 7 and tightened, and finally escapes through the enlarged end opening in said slot. After the twine has slipped from the bill it passes off the guard $g^\times$ and moves into the position shown in the broken outlines $t\ n\ n$ in Fig. 3, which is finally the position it has to assume before the knife can cut it. The cutting happens with the forward motion of the latch, which coöperates with the bundle-ejector arms, knotter-head, and other parts timed in accord therewith.

The twine-holding mechanism is attached to the frame-support or round post $8^\times$, on the upper part of which rotates a spur-wheel $d'$, provided in this case with six teeth $d$ and a sleeve $e$, at the lower end of which is a disk $e'$ with six teeth $e^2$, Figs. 11 and 12. Aforesaid disk $e'$ plays upon a plate $f$ under it and which is held from rotation by the stud end $8^{\times\times}$ in the hole $f^\times$ and a deep notch $f'$ in the outer edge of said plate, so placed that it will receive the twine from the needle 2, the point of which passes a short distance beyond the said notch when at the end of its upstroke. Over the edge opposite $f'$ is held a finger $f^6$ by a single bolt $f^2$, passing through a chambered boss containing a coiled spring $f^{10}$, by means of which the pinch or pressure of the parts $f\ f^6$ upon the disk $e'$ is regulated and by means of which the ends of the twine are held. The finger is held from turning by means of a lug $f^3$ or equivalent device on the plate $f$. There is a marginal upturned circumferential flange $f^4$ and within it a parallel low rib $f^5$ to aid in holding the twine, especially adapted to work where the twine happens to be thin and to prevent injury to the twine. As the tooth $e^2$ nearest the twine advances it doubles the twine upon it, the part above the tooth being held by the finger edge, the motion of the tooth ending about when the outer part of the twine has slipped into the notch $f^9$, its advancement to that place being facilitated by the inclined flange $f^8$, on some part of which the twine first rests, the twine being now in the condition to receive a bundle of grain, (indicated by the broken line $t\,n$, Fig. 1,) and as soon as a bundle is formed the twine assumes the position indicated by the broken line on the platform 10, after which the needle makes an upstroke and the cord winds around the bundle, as shown by the full lines of the cord in Fig. 1.

On the knotter-frame and cast integral therewith is a horizontal arm opposite and near the shaft $sh$, on which is a staple $u$, cast integral with said arm by allowing a spur of sand in the mold to project through the mold of the arm, as indicated by the curved and broken lines shown in Fig. 37, and on said staple is hung a bundle-guard 6, formed out of a stout wire which is doubled in its center, so as to form a loop which will just fit on said staple $u$, beyond which it is twisted into a straight single part of suitable length, from the termination of which the two parts are somewhat sharply bent to reach back to the breastplate and separated, each part entering a receptacle $r'$ at the corners of the breastplate after being suitably curved, as shown in Figs. 1 and 2. The said guard is thus held securely in its place by the single key $u'$ in the front end of the staple or loop $u$. One bundle-discharge arm 7 is attached to the tier-wheel 9 and a second discharge-arm parallel thereto is attached to its shaft $sh$.

To the breastplate are attached lugs 11 near the two ends of the bundle-guard, and to them is attached a broad arm, which may be constructed in various forms, (here shown as a three-sided square 4,) the fourth side being a rod 5, passing through said lugs in the breastplate and the ends of the two sides on which said frame turns as on a hinge. One end of a coiled spring 11, of which the other end is fast to the breastplate, draws the frame 4 from the position into which it is thrown by the discharge of the bundle. Said position is indicated by broken outlines in Fig. 1. The normal position of said arm is shown in Fig. 1, with its lower end held within the compressor-arm 3, and its object is to close the space and aid in forming a more round, solid, and complete bundle and to do that with less power than is now required, owing to said opening from which a part of every bundle escapes unaffected by the compression and which therefore necessitates so much harder pressure on what can be compressed.

In Fig. 2 the arm 4 is shown at its upper position in full lines, and there is a stop $11^\times$ to hold or stop said arm 4 at the end of its return stroke.

The needle-arm 1, needle 2, and compressor-arm 3 are of the usual construction.

The normal position of the tier-wheel is shown in Fig. 3, the roller $g^2$ being on the inside of the flange $b'$, which is the side toward the pinion $a^4$ and its coöperating parts, the latch $g$ and its parts being, therefore, at the farthest inward position, the knife-edge $g^8$ cutting the twine just before reaching the end of its inward stroke, and the double prongs $g^3$ are on the shoulders or stops $a^5$ of the knotter-head pinion, and the latch-spur $g^4$ has passed under the slot-spur $r$, the point of which lies far enough across the breastplate-slot $2^\times$ to so close it as to leave but enough space for the twine to pass by said point when the latch-spur $g^4$ is at or near the end of its outward stroke, the tier-wheel 9 holding said latch at its innermost position with the inner side of the flange $b'$ during its revolution from the inner end of the bevel-face $b^2$ to the inner end of the bevel-face $b\,b$. At said last point the latch-roller $g^2$ runs through the inclined channel formed between the inclined cam-faces $b\,b$ and $b^0$ and to the highest point of the cam-face $b^{10}$, the said outward motion of the latch-roller being resisted by the rigid twine which now presses against the inner edge of the arm $g^7$ and contrary to said outward motion of the latch, and from said highest point of the cam-face $b^{10}$ the said surface approaches the inner or unflanged side or end of the tyer-wheel, as shown, for the purpose of bringing the two points of the latch-spurs $g^3$ on each side of the blunt point of the cam $a^3$, formed by the sides of the cam, proceeding from the inner shoulder edges and which terminate under the long tooth $a^\times$ of the pinion $a^4$, said pinion being actuated by the radial rack-teeth $b$ and brought in time to said position, the tension of the twine drawing the latch-roller $g^2$ forward onto the cam-surface $b^{10}$. Nearly at the same time when the rack $b$ is in the center of its work the tooth or spur $b^4$ engages with a tooth $d$ of the twine-holder pinion $d'$ and turns it, as in this construction shown, one-sixth of a revolution and causes a tooth $e^2$ of the twine-holding disk $e$ to take with it between the plate $f$ and finger $f^6$ and to pass into the notch $f^9$ on finger $f^6$ the twine laid over the said finger and into the notch $f'$ by the needle, where with a preceding strand of twine the two strands are tied by the knotter-head.

Between the knotter-head and the twine-holding mechanism beyond it the twine is held above the twine-cutter, and the twine cannot come before the reciprocating knife-edge until the knotter-head has released the twine from it and the slot-bridge $rg^4$ is opened and the twine has passed beyond the bridge. After the twine has so moved to the last end of the slot $2^\times$ it inclines down from the twine-holder for the knife-edge to cut it. The usual driving-wheel $pp$ and belt $pb$ are shown in Fig. 1 on the tier-wheel shaft.

The high spur $a^\times$ on the knotter-pinion insures its engagement with the front end of the tier-wheel rack, and thereby the starting of the knotter and the latch, the latter being necessarily slightly prior in its rearward action, which is its release, to release the cam or stops forming a part of said pinion, all of said parts being so constructed as to act unfailingly and correctly in their determined order, from which they can in no wise be changed. The bipillar knotter-frame has its said supports so formed as to also form special supports for special parts of the mechanism, and the gape-closing arm operating in connection with the compressor-arm so eases the force required for forming and tying the bundle as to greatly relieve the draft of the harvester.

The cam $h$ acts only when the twine is broken, and thereby sends the point of the mandible under the cams $i^5 i^6$; otherwise the twine depresses the mandible and sends it under said cams.

The spur $r$, reaching partly across the slot $2^\times$ of the breastplate, has a rounded point $r^2$ at its free end.

What I claim is—

1. The combination with a knotter having fixed projecting parts, of a tier-wheel and reciprocating parts actuated by said tier-wheel, with means on said reciprocating parts to engage said knotter-head parts to put and hold the knotter to the starting-point, substantially as specified.

2. The combination with a rotary knotter-head with fixed diametrically-opposed shoulders, of reciprocable spurs to place and release said shoulders, and a tier-wheel with means to reciprocate said spurs and start said knotter under timed conditions, substantially as specified.

3. The combination with a hinged reciprocable arm carrying a twine-cutter, of a hinged reciprocable arm in a plane parallel to said twine-cutter arm provided with mandible-cams, substantially as specified.

4. The combination with a hinged reciprocable arm provided with a twine-cutter, and a hinged reciprocable mandible cam-arm in a plane parallel to said twine-cutter arm, of a single hinge-center for both said arms, substantially as specified.

5. The combination with a slotted breastplate and knotter-bill, of a hinged reciprocable arm to move the twine laterally to said knotter and an elevated horizontal arm thereon to hold the twine at an upper position and drop it therefrom to a lower position, and a knife to cut the twine in its latter position, substantially as specified.

6. The combination with a rotatable knotter-head with hinged mandible, of a fixed closing-cam followed by cams combinedly movable, to successively open and close said mandible, substantially as specified.

7. The combination with a knotter-head with hinged mandible, of combinedly-yielding cams to successively open said mandible to receive both band ends and to close the mandible thereon, substantially as specified.

8. The combination with a slotted breastplate and knotter-bill, of a hinged reciprocable arm with spur to open and close said slot and a horizontal arm to hold the twine in an upper position and an arm to move the twine laterally upon said bill, a knife below said twine position and means to drop the twine before the edge of said knife, substantially as specified.

9. The combination with a twine-holder-actuating pinion, of a flanged tier-wheel with an automatically-adjustable spur to actuate said pinion, substantially as specified.

10. The combination with a bipillar knotter-frame whereof one of said pillars is a round wheel-stud and the other pillar a means to hold hinged operating mechanism, of a bolt forming both the hinge-axis of said twine-operating mechanism and means for fastening said pillar to its support, substantially as specified.

11. The combination with a knotter-frame pillar and bolt to fasten said pillar to its support, of a hinge-operating cam-arm and a hinge-operating twine-operating arm on a common axis, substantially as specified.

12. The combination with a knotter-frame and hinge-operating twine-operating arm and hinge-operating cam-arm, of a bolt to fasten said pillar to its support and to form the axis for said twine-operating mechanism and cam-arm, substantially as specified.

13. The combination with a knotter-pinion and reciprocating piece to draw the twine out of its line, and means whereby said twine will return said piece, of a tier-wheel with notched flange and mechanism whereby said reciprocating piece operates on said flange and through said notch, substantially as specified.

14. The combination with a knotter-pinion and reciprocating piece to draw the twine out of its line, and means to hold the twine to its new place, and means whereby said twine will return said piece, of a tier-wheel with notched flange and mechanism whereby said reciprocating piece operates, substantially as specified.

15. The combination with a hinged reciprocating piece having an arm at right angles to said piece, and in an arc to its hinge-center, provided with twine-cutting mechanism and a roller-holding spur, all in an integral piece; and a knotter-pinion, of a tier-wheel, partially flanged, and a cam, said flange and cam projecting, radially, beyond said wheel to engage said spur and operate said reciprocating piece, substantially as specified.

16. The combination with a slotted breastplate and a reciprocable bar parallel to said slot, with fixed members transverse to said slot to laterally move and to cut the twine, and a roller-holding spur to said bar, of a tier-wheel with rack-gear and flange in planes parallel to the wheel-plane and projecting radially beyond said wheel, said flange and spur engaging to actuate said bar, substantially as specified.

17. The combination with a pinioned knotter, a slotted breastplate and a reciprocable bar parallel to said slot with twine-bridge and knife thereon transverse to said slot and a roller-carrying spur to said bar, of a tier-wheel with rack-gear and flange in planes parallel to the plane of said wheel and projecting radially beyond it to engage said spur and pinion, substantially as specified.

18. The combination with a twine-holder base-plate having twine-receiving notch and a chambered receptacle transverse to said plate of a finger with working surface parallel to said plate and a bolt and spring in said chamber, substantially as specified.

19. The combination with a slotted breastplate, of a spur moving longitudinally to itself to open and close said slot, a tier-wheel with notched flange, said flange in a plane parallel to the plane of said wheel and radially beyond it and a rollered spur on mechanism directly connected to said spur, actuated by said notched flange, substantially as specified.

20. The combination with a rod centrally doubled into an eye or loop beyond which its members are twisted upon each other and beyond said twist said members are spread apart to a proper width and inclination after which they are sharply bent upon themselves and parallel to said loop and to each other until said loop and ends of said members fit to their respective holders, of a breastplate to receive said rod ends and a stud to receive said loop, substantially as specified.

21. The combination with a twine-holder-actuating pinion, of a tier-wheel circumferentially flanged, said flange in a plane parallel to the plane of the wheel, with a projection on said flange carrying a spur to actuate said pinion, substantially as specified.

22. The combination with a twine-holder-actuating pinion, of a flanged tier-wheel and a reciprocable tooth on said flange to actuate said pinion, substantially as specified.

23. The combination with a knotter-pinion and twine-holder pinion, of a tier-wheel with a notched radial flange having a rack-gear between said flange ends and blank spaces between said gear and flange ends and a spur on a radial extension of said flange to actuate said twine-holder pinion, substantially as specified.

24. The combination with a tier-wheel having a notched flange and rack-gear in equiradial and parallel planes, said gear opposite said notch, and a spur, radially beyond said flange, of a twine-holder and a knotter both actuated directly by said wheel, substantially as specified.

25. The combination with a tier-wheel having a notched flange and a rack-gear in parallel and equiradial planes, said gear opposite said notch, and a spur on and radially beyond said flange, of a twine-holder and a knotter both directly actuated by said wheel, and a twine-cutter with an actuating-piece intermediate said cutter and wheel, substantially as specified.

26. The combination with a tier-wheel having a notched flange and a rack-gear in parallel equiradial planes, said gear opposite said notch, and a spur radially beyond said flange, of a twine-holder and a knotter directly connected to said wheel and a twine-cutter and a twine-bridge with an intermediate piece to connect said tier-wheel to said cutter and bridge, substantially as specified.

27. The combination with a slotted breastplate, of a bisupported knotter-frame, said two parts supporting rotary twine-holding and hinged twine-cutting mechanism, respectively, substantially as specified.

28. The combination with a tier-wheel with an automatically-adjustable spur, at right angles to the plane of the wheel, of a twine-holder pinion actuated by said spur, substantially as specified.

29. The combination with a tier-wheel and twine-holder, of a hinged spring-actuated plate in the plane of the wheel with spur thereon at right angles thereto, substantially as specified.

30. The combination with a twine-holder and pinion therefor, of a tier-wheel with an automatically-adjustable spur at right angles to the plane of the wheel to operate said pinion, substantially as specified.

31. The combination with a tier-wheel with an automatically-adjustable tooth, reciprocable transversely to the plane of said wheel, of a shaft with a twine-holder pinion, substantially as specified.

32. The combination with a tier-wheel with a flange in the plane of the wheel, with a spur reciprocable with a hinged plate in said flange at right angles thereto, of a knotter-frame pillar and twine-holder revoluble thereon, actuated by said spur, substantially as specified.

33. The combination with a knotter-frame with horizontally-parallel ribs, whereof one rib has a notch for a shaft-bearing, and whereof the other rib is bored for a shaft-bearing, of a socketed knotter-pinion with a gudgeon for said notched rib and a shaft for said bored rib and means to connect said shaft and pinion, substantially as specified.

34. The combination with a knotter-frame with horizontally-parallel ribs whereof one has a notch shaft-bearing and the other rib a bored shaft-bearing, of a gudgeoned and socketed pinion and shaft for said socket, substantially as specified.

35. The combination with a knotter-head having fixed projecting parts, of reciprocating mechanism provided with means to bring the twine on the bill and means to engage said fixed knotter-head parts to put and hold the knotter to the starting-point, substantially as specified.

36. The combination with a tier-wheel with a notched flange, having gear-teeth between the ends of said flange, and said flange and gear-teeth radially exterior to said wheel and in planes parallel to the wheel-plane, and a slotted breastplate, of reciprocable mechanism provided with a twine-spur over said slot and a roller-spur actuated by said flange, substantially as specified.

37. The combination with a breastplate and knotter-bill, of a hinged arm, reciprocable in a plane parallel with the plane of said plate, provided with an elbowed arm in a plane vertical to said reciprocable arm and a twine-cutter in the plane of said elbowed arm, substantially as specified.

38. The combination with a slotted breastplate, of an arm reciprocable in a plane parallel with the plane of said plate provided with an elbowed arm in a plane vertical to said reciprocable arm, a cutter in the plane of said elbowed arm and means to adjust the edge of said cutter, substantially as specified.

39. The combination with a twine-holder base-plate with twine-receiving notch and a receptacle transverse to said plate and chambered from its outer end, of a finger with bolt and coiled spring in said chamber and a notched rotatable disk between said plate and finger, substantially as specified.

40. The combination with a twine-holder, a ribbed base-plate provided with a twine-notch, a finger-holding flange and a chambered bolt-receptacle, of a finger with a bolt and spring in said chamber, and a notched disk to receive the twine from the notch of said base, substantially as specified.

41. The combination with a twine-holder base-plate provided with a twine-receiving notch and a chambered bolt-receptacle, of a finger with a longitudinal inclined ridge and a twine-notch at the lower end of said ridge and a bolt and spring in said chamber, substantially as specified.

42. The combination with a notched base-plate provided with a chambered bolt-receptacle, the base of said receptacle in the plane of said plate and the axis of said chamber vertical to said plate, of a finger with bolt and spiral spring in said receptacle and a notched disk to receive the twine from said base-plate notch and a tier-wheel with a spur in flange, said flange in a plane parallel to the plane of said wheel, with intermediate mechanism to operatively connect said wheel and disk, substantially as specified.

43. The combination with a centrally-held base-plate provided with a twine-receiving notch and a finger-flange and a chambered bolt-receptacle, of a finger provided with a twine-ridge, a twine-notch, and a bolt and spring in said chamber, substantially as specified.

44. The combination with a knotter-pinion, a slotted breastplate and a twine-bridge across said slot, of a tier-wheel with toothed rack and flange in parallel planes and a cam, radially exterior to said wheel, reciprocable mechanism to carry said twine-bridge provided with a roller-spur to engage said flange and cam, substantially as specified.

45. The combination with a slotted breastplate and a twine-holder, of an arm parallel to said slot with twine-bridge and twine-cutter, each transversely attached to said arm and longitudinally reciprocable across said slot, reciprocable mechanism to hold the twine above and means to pass it before the cutter edge, substantially as specified.

46. The combination with a twine-holder-actuating pinion, of a tier-wheel circumferentially flanged, said flange in the plane of the wheel, and a reciprocable spur on said flange to actuate said pinion, substantially as specified.

47. The combination with a knotter-head having diametrically-opposite placed fixed projecting parts and a pinion with a tooth projecting beyond its fellows, of reciprocable spurs to operate said opposed projections, a tier-wheel and connecting mechanism to actuate said spurs, a gear-sector on said tier-wheel arranged to engage and release said pinion-tooth at its ends, substantially as specified.

48. The combination with a longitudinally-reciprocable arm having means to guide and hold a parallel-edged end-sharpened twine-cutter, and a fixed stop for said edge, substantially as specified.

49. The combination with a longitudinally-reciprocable arm having means to guide and hold a parallel-edged end-sharpened blade, of fixed means to hold and to invariably adjust the edge of said blade to a predetermined line, substantially as specified.

50. The combination with a twine-holder pinion, of a tier-wheel circumferentially flanged, said flange in the plane of the wheel, and a reciprocable spring-actuated spur on said flange to actuate said pinion, substantially as specified.

51. The combination with a twine-holder-actuating pinion, of a circumferentially-flanged tier-wheel with a radially-extended projection, the plane of said flange parallel to the plane of said wheel, said projection provided with a spur automatically adjustable to said pinion, substantially as specified.

52. The combination with a shaft with non-rotatable centrally-held twine-holder base-plate thereon and a bolt-receptacle, chambered from its outer end, projecting vertically from the said plate, and a twine-receiving disk, of a finger on a peripheral portion of said plate, a bolt to connect, and a spring on said bolt, in said chamber, to press said plate, disk, and finger upon each other, substantially as specified.

53. The combination with a knotter-frame post with non-rotatable centrally-held twine-holder base-plate thereon, a bolt-receptacle, chambered from its outer end, projecting vertically from the said plate, and a twine-operating disk on said pillar, of a finger on said plate, a bolt to connect and a spring on said bolt in said chamber to press said plate, disk, and finger upon each other, substantially as specified.

54. The combination with a non-rotatable shaft with centrally-held twine-holder base-plate thereon and a bolt-receptacle, chambered from its outer end, projecting vertically from the said plate, and a finger-stop on the edge of said plate, of a finger on a peripheral portion of said plate, a bolt to connect, and a spring on said bolt, in said chamber, to compress said plate, disk, and finger upon each other, substantially as specified.

55. The combination with a non-rotatable shaft with centrally-held circularly-ribbed twine-holder base-plate thereon and a bolt-receptacle, chambered from its outer end and a twine-disk on said shaft, of a finger and a bolt with coiled spring in said chamber to press said plate, disk, and finger upon each other, substantially as specified.

56. The combination with a knotter-head having fixed projecting spurs, oppositely placed to its axis, of reciprocating mechanism with means to engage said opposed spurs to put and hold the knotter to the starting-point, and a twine-cutter fixedly attached to said reciprocating mechanism, substantially as specified.

ANTON HEUSCH.

Witnesses:
WM. ZIMMERMAN,
C. P. PACKER.